United States Patent [19]

Mansell et al.

[11] Patent Number: 4,837,253

[45] Date of Patent: Jun. 6, 1989

[54] CORROSION INHIBITING PIGMENT

[75] Inventors: J. Douglas Mansell, Akron; Laurence E. Jones, Barberton; Harlan B. Johnson, Rittman; Thomas G. Krivak, Akron, all of Ohio; Dennis W. Carson, Lower Burrell, Pa.

[73] Assignee: PPG Industries, Inc., Pittsburgh, Pa.

[21] Appl. No.: 132,398

[22] Filed: Dec. 15, 1987

[51] Int. Cl.$^4$ ................................................. C08K 3/36
[52] U.S. Cl. ................................. 523/443; 523/513; 524/492; 524/493; 106/461
[58] Field of Search ............... 106/306; 523/443, 513; 524/492, 493

[56] References Cited

U.S. PATENT DOCUMENTS

| | | |
|---|---|---|
| 841,603 | 1/1907 | Toch . |
| 2,204,113 | 6/1940 | Allen ........................ 23/110 |
| 2,679,463 | 5/1954 | Alexander et al. .............. 106/306 |
| 2,805,955 | 9/1957 | Allen ........................ 106/288 |
| 2,910,375 | 10/1959 | Allen ........................ 106/306 |
| 2,980,644 | 4/1961 | Atkinson ..................... 260/41.5 |
| 3,034,913 | 5/1962 | Lagerstrom .................. 106/306 |
| 3,034,914 | 5/1962 | Lagerstrom .................. 106/306 |
| 3,297,616 | 1/1967 | Fisher, Jr. et al. ............. 260/29.6 |
| 3,655,582 | 4/1972 | Dupre et al. ................. 252/387 |
| 3,923,674 | 12/1975 | Shannon ..................... 252/62 |
| 4,157,920 | 6/1979 | Wason ....................... 106/292 |
| 4,360,384 | 11/1982 | McKaveney et al. ............ 106/1.12 |
| 4,419,137 | 12/1983 | Cayless et al. ................ 106/14.39 |
| 4,463,108 | 7/1984 | Wagner et al. ................ 523/216 |
| 4,517,325 | 5/1985 | Perfetti ...................... 524/188 |
| 4,527,178 | 7/1985 | Usui et al. ................... 346/207 |
| 4,533,525 | 8/1985 | Minamide et al. .............. 428/469 |
| 4,544,688 | 10/1985 | Salensky et al. ............... 523/458 |

FOREIGN PATENT DOCUMENTS

| | | | |
|---|---|---|---|
| 751308 | 1/1967 | Canada ............... | 423/339 |
| 721961 | 1/1955 | United Kingdom ..... | 423/339 |

*Primary Examiner*—Lewis T. Jacobs
*Attorney, Agent, or Firm*—Irwin M. Stein

[57] ABSTRACT

Corrosion inhibiting calcium-containing amorphous precipitated silica is described. The silica is prepared by admixing simultaneously in a reactor aqueous alkali metal silicate, e.g., sodium silicate, acidifying agent, e.g., hydrochloric acid, and a water-soluble source of calcium, e.g., calcium chloride. The product contains from 6 to 9 weight percent calcium (as CaO). The silica product may be incorporated into a coating composition used for corrodible metallic surfaces.

24 Claims, No Drawings

CORROSION INHIBITING PIGMENT

DESCRIPTION OF THE INVENTION

The present invention relates to a corrosion inhibiting pigment, a method for preparing such pigment, to a film-forming coating composition containing such pigment and to articles to which the coating composition is applied.

Preventing corrosion of corrodible metal surfaces, e.g., a steel surface, has been accomplished with varying degrees of success by means of coatings. Commonly, the corrodible metallic surface is coated with the primer containing a corrosion inhibiting pigment. The chromates of zinc, lead and strontium have been the corrosion inhibiting pigments of choice for use in such primer coatings. Recently, however, there has been increasing pressure for replacement of toxic chromate pigments, such as strontium chromate, with non-toxic, environmentally safe materials. For example, U.S. Pat. No. 4,419,137 describes a corrosion inhibiting pigments of a silica gel or alumina having metal cations, such as calcium, zinc, lead, strontium and barium, which are bound to the surface of the pigment particles by an ion exchange process.

It has now been discovered that calcium-containing amorphous precipitated silica having relatively low surface area, oil absorption and conductivity inhibits corrosion of corrodible metal surfaces to which has been applied a coating composition containing such silica, e.g., a primer coating. More particularly, the inhibitive silica of the present invention has a BET surface area of between about 10 and about 50 square meters per gram, an oil absorption of between about 40 and 100 milliliters of oil per 100 grams of silica, a conductivity of less than about 300 micromhos per centimeter and contains between about 6 and about 9 weight percent calcium, calculated as calcium oxide. This calcium-containing amorphous precipitated silica is prepared by reacting simultaneously in a reactor alkali metal silicate, e.g., sodium silicate, a water soluble calcium salt, e.g., calcium chloride, and an acidifying agent, e.g., hydrochloric acid, under specific sequential reaction conditions.

DETAILED DESCRIPTION OF THE INVENTION

In preparing the corrosion inhibiting calcium-containing amorphous precipitated silica of the present invention, water-soluble alkali metal silicate is combined in a suitable reactor with water-soluble calcium salt and acidification reagent. The soluble alkali metal silicate may be either a commercial or technical grade of silicate, e.g., sodium silicate, potassium silicate or lithium silicate. Preferably, the silicate is sodium silicate, which is the least expensive of the aforedescribed silicates and more readily available commercially. The alkali metal silicate may be represented by the molecular formula, $M_2O(SiO_2)_x$, wherein M is the alkali metal and x is a number of from 1 to 5. More commonly, x is a number from 2 to 4, such as between 3.0 and 3.4, e.g, 3.2 or 3.3. The preferred sodium silicate molecular formula may be expressed as $Na_2O(SiO_2)_x$, wherein x is a value of from 3.0–3.4, usually from 3.2 to 3.3. The concentration of alkali metal silicate in the aqueous silicate reactant solution can vary and bears most significantly on the rate of production of the precipitated silica. For example, sodium silicate solutions may be used having an $Na_2O$ concentration from about 18.75 grams per liter to about 90 grams per liter. For sodium silicate having about 3.2 moles of silica per mole of $Na_2O$, the corresponding concentration of silica ($SiO_2$) in the aqueous alkali metal silicate reactant will range from about 60.00 grams per liter to about 288 grams per liter of silica.

The source of calcium utilized to prepare the calcium-containing amorphous precipitated silica of the present invention is water-soluble calcium compound, e.g., as calcium salt, such as the oxide, hydroxide, chloride, nitrite or acetate of calcium. A water-soluble calcium compound that is readily convertible to the chloride salt in an aqueous medium may be used. Preferably, the calcium compound is calcium chloride, which has a significant solubility in water and is readily commercially available. The concentration of the calcium compound, which is supplied to the reactor as an aqueous solution, may also vary. In the case of calcium chloride, concentrations of from about 82 grams per liter to about 320 grams per liter have been used. The amount and rate of calcium compound introduced with the alkali metal silicate and acidifying agent into the reactor is that amount and rate which are sufficient to yield about one (1) mole of calcium (calculated as calcium oxide) to about ten (10) moles of silica. After adjustment of the pH in the described process, the resulting dried solid silica product will contain from about 6 to about 9 weight percent calcium (calculated as calcium oxide), based on the weight of the silica product.

Acidifying agents that may be used in the process of preparing the corrosions inhibitive silica of the present invention include carbonic acid or a suitable inorganic mineral acid, e.g., hydrochloric acid and nitric acid. Sulfuric acid should be avoided due to the insolubility of calcium sulfate in water. The carbonic acid acidifying agent may be furnished by introducing carbon dioxide into the reactor containing the other reactants. Preferably, the acidifying agent is hydrogen chloride, e.g., hydrochloric acid. Use of calcium chloride and hydrochloric acid is preferred since use of such reactants avoids introducing different anions into the reaction system. The amount of acidifying agent admixed with the alkali metal silicate and water-soluble calcium compounds, e.g., sodium silicate and calcium chloride, is that amount sufficient to neutralize between about 15 and about 50 percent of the alkali metal oxide, e.g., sodium oxide ($Na_2O$), content of the alkali metal silicate reactant. Preferably, the amount of acidifying agent used and the rate at which it is charged to the reactor is sufficient to neutralize about one-fourth (25 percent) of the alkali metal oxide content of the alkali metal silicate reactant. The concentration and rate of introduction into the reactor of acidying agent, e.g., hydrochloric acid, can vary and will be determined by the concentration and rate of introduction of the alkali metal silicate reactant into the reaction system. With respect to hydrochloric acid, concentrations of from about 24.5 grams per liter to about 98 grams per liter hydrogen chloride have been used.

In preparing the calcium-containing amorphous precipitated silica of the present invention, the reactants are added simultaneously to a suitable reactor, which preferably contains a foreshot of water, such that the reactants are added to an aqueous reaction medium. The amount of water contained in the reactor prior to the commencement of the process may vary and will depend on the amount of water introduced with the reactants since the reactants are supplied as aqueous solutions. The foreshot of water may amount to from about 25 to about 60 percent of the total reactor volume and should be sufficient to conduct the reaction in a stirred aqueous reaction medium.

The temperature at which the reactants are combined may vary from about room temperature, e.g., about 20° C., to about 95° C. Usually, the temperature at which the process is performed varies between about 80° C. and about 95° C. Preparations that utilize a mixing temperature of about 90° C. have been found to produce a silica product particularly useful as a corrosion inhibiting pigment.

High local concentrations of the reactants within the reactor should be avoided. Consequently, the reactor is equipped with one or more agitators to provide mixing of the total reactor volume. Further, homogenous dispersion of the calcium reactant and acidification agent has been found to be desirable. Therefore, the calcium reactant, e.g., calcium chloride, and acidification agent, e.g, hydrochloric acid, are preferably introduced simultaneously into the reactor at a location where a high shear or vigorous agitation is provided. The alkali metal silicate reactant may be introduced into the reactor at a location displaced from the point of high shear agitation. In a preferred embodiment, the reactor is equipped with both a low speed agitator for mild agitation and a high shear agitator to accomplish mixing of the reactants. One satisfactory method of introducing the reactants into the reactor is to introduce the sodium silicate into the reactor vessel near the low speed agitator, e.g., near the bottom of the reactor, and to introduce the calcium chloride and hydrochloric acid into the reactor adjacent to the high shear agitator.

The reactants are added to the reactor slowly and simultaneously at rates calculated to obtain the degree of neutralization of alkali metal oxide, e.g., $Na_2O$, and provide the amount of calcium as calcium oxide (relative to the amount of silica therein introduced) described hereinabove. The reactants may be at room temperature. The calcium chloride and hydrochloric acid may be introduced separately, but preferably are introduced as a mixture, since that embodiment reduces by one the number of reactant streams that require monitoring. It is preferred that the concentration of the reactants be such that all of the reactants are added to the reactor over substantially the same time period to obtain a relatively homogeneous reaction medium and silica product.

Total time used to admix the reactants in the reactor may vary. It has been found that total admixing times ranging from about 1 hour to about 4 hours, e.g., two to four hours, are adequate. In accordance with a preferred method of practicing the process described herein, a foreshot of water is introduced into the reactor and heated to about 90° C. The reactor is equipped with low speed agitator in the middle of the reactor and a high shear agitator at the side of the reactor. Sodium silicate reactant is introduced near the bottom of the reactor opposite the high shear agitator and simultaneously therewith an aqueous mixture of calcium chloride and hydrochloric acid reactant is introduced into the aqueous reaction medium within the reactor adjacent to the high shear agitator. The reactants are each added to the reactor over a period of 2-2½ hours.

After completing addition of the reactants to the reactor, the resulting aqueous slurry is maintained at the mixing temperature, e.g., about 90° C., for from about 1 to about 12 hours, e.g., from about 1 to about 3 hours, to allow the reaction to reach equilibrium. In a preferred embodiment, the aqueous silica slurry during this aging step is circulated through a wet mill to break-up any lumps or agglomerates of amorphous precipitated silica thay may have formed.

The pH of the aged aqueous slurry will generally be alkaline, e.g., between about 9 and about 9.8. Further acidification agent, e.g., hydrochloric acid, is then added to the reactor slurry to adjust the pH to between about 7.0 and about 8.0, typically between about 7.3 and about 7.7, e.g., 7.5.

After adjusting the pH of the aqueous product (silica) slurry, the solids in the slurry are recovered by any suitable solid-liquid separating means, such as a filter press, drum filter, centrifuge, etc. The resulting solids, e.g., the filter cake, are thoroughly washed with water, to remove substantially all of residual water-soluble alkali metal inorganic salts, e.g., sodium chloride. Washing of the recovered solids is extensive and exceeds conventional washing practices for amorphous precipitated silica. Washing of the solids is continued until the conductivity of the product (as measured in a 10 percent aqueous slurry) is not more than 180 micromhos per centimeter. Some final washing with deionized water may be required to obtain the desired level of conductivity.

Washed recovered solids are dried by any suitable drying means, e.g., spray drying, tray and compartment drying, forced draft oven drying or rotary drying. Preferably, the washed solids are spray dried. Dried calcium-containing silica prepared as described hereinabove may be used as recovered from the drying step if the particles are sufficiently finely-divided, e.g., such as product recoved from a spray drier. If, the drying step produces undesirably large particles, the product can be subjected to a milling or grinding step to produce a more finely-divided product having the appropriate aggregate particle size. Such milling can be performed in conventional equipment, such as hammer mills, fluid energy mills and vertical mills. When milling is required, vertical milling is preferred.

Corrosion inhibiting amorphous precipitated silica produced by the above-described process has a BET surface area of between about 10 and about 50, typically between about 15 and 40, e.g., 20, square meters per gram ($m^2/g$); an oil absorption from about 40 to about 100, more typically from 60 to 80 e.g., 70, milliliters of oil per 100 grams of pigment (ml/100g); a pH of from about 7 to about 10.5, e.g, from about 8.0 to about 9.9, e.g., about 9.3; a conductivty of less than 300, e.g., less than 180, micromhos per centimeter, more particularly from about 75 to about 150 micromhos per centimeter; a calcium content of from about 6 to about 9, e.g. about 7.5 weight percent calcium (as CaO); and a median agglomerate particle size of between about 3 and about 8 microns (micrometers), e.g., about 4 microns.

The surface area of the silica product can be determined by the method of Brunauer, Emmett and Teller, J.Am. Chem.Soc., 60, 309 (1938). This method, which is often referred to as the BET method, measures the absolute surface area of the material by measuring the amount of gas adsorbed under special conditions of low temperature and pressure. Oil absorption is the volume of dibutyl phthalate oil necessary to wet 100 grams of the silica product. These values can be obtained using a method like the method described in ASTM method D 2414-65. The pH of the product is measured by a conventional pH meter on a 5 percent aqueous slurry of the silica, i.e., 5 grams of silica in 95 grams of water. Conductivity is measured by a conductance meter on a 10 percent aqueous slurry of the silica, and the particle size is measure by a Coulter Counter.

The product is made up of particles which are thought to be a composite of calcium oxide and silicon oxide in the ratio described herein. The precise mode of association of the calcium and silica in the composite particles is not understood, but it is though that the particles are substantially homogeneous.

The calcium-containing amorphous precipitated silica prepared by the described process is particularly suitable for use as a corrosion inhibiting pigment for industrial coatings. It is contemplated that the product may be used in other applications in which amorphous precipitated silicas find application. Such industrial coatings are used on corrodible metallic surfaces, such as agricultural implements, aluminum extrusions, appliances, business machines, steel and aluminum coil, metal containers for beverages and the food industry, metal office furniture, metal surfaces used in the transportation industry, e.g., those used in automobiles, trucks, aircraft, railroad rolling stock and naval vessels. In particular, it is contemplated that the silica inhibitive pigment described herein will find particular application in coatings used on steel and clad steel substrates, e.g., galvanized steel and aluminum, lead, zinc and nickel composite claddings. More particularly, such inhibitive pigment will find application in primer coatings for such substrates, since corrosion protection is the the function of the primer coating, although smoothing out small imperfections is a further function of such coating.

Coating compositions in which the inhibitive pigment of the present invention may be used include a resinous binder and a filler. The inhibitive pigment may be a part of or comprise all of the filler, i.e., the non-volatile, component of the coating composition. Sufficient of the inhibitive silica pigment is introduced into the coating to impart corrosion-resistant characteristics to the coating composition, i.e., a corrosion inhibiting amount. Such amount of inhibitive pigment will generally be less than the critical pigment volume concentration and may be between about 1 and about 50 percent, e.g., 10-30 percent, of the coating by volume. In a different context, the inhibitive pigment will generally represent between about 2 and about 15 weight percent of the coating composition. In addition to the inhibitive pigment, the filler may also comprise other extenders and pigments, such as talc, mica, zinc phosphate, zinc oxide, calcium carbonate, barium sulfate, titanium dioxide, carbon black, manganese oxide and iron oxides. These auxiliary non-volatile components of the coating composition will typically represent between 25 and 65 weight percent of the coating composition. Corrosion resistance afforded corrodible metallic surfaces by a coating composition containing the inhibitive pigment of the present invention approximates that afforded by strontium chromate.

The film-forming composition of the coating may be any of the compositions useful in coating applications. The coating composition will generally comprise between about 34 and about 60 weight percent of volatile components, which includes an organic resinous binder material, solvent and other volatile ingredients. The choice of the particular binder will depend upon the characteristics that are desired for the protective coating composition in each particular application. The resinous binder, for example, may be selected from such organics as alkyd resins, epoxy ester resins, drying oils, epoxy resins, chlorinated rubber, polystyrene, polyvinyl butyral resins, polyvinyl acetate resins, silicones, phenolic resins, thermoplastic polyhydroxy ethers, polyesters, acrylic polymers and polymethanes. Organic resinous binders used predominantly in industrial coatings are acrylic polymers, polyesters, including alkyds, epoxy resins and polyurethanes.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene flouride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as a condensate of an amine or an amide with formaldehyde such as urea, melamine, or benzoguanamine reacted with formaldehyde or a lower alkyl ether of such condensate in which the alkyl groups contain from 1 to 4 carbon atoms. Other crosslinking agents such as polyisocyanates including blocked polyisocyanates may also be used. Also, the acrylic polymer can be prepared with N-(alkoxymethyl)acrylamides and N-alkoxymethyl)methacrylamides which result in self-crosslinking acrylic polymers.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are xylene and toluene and ketones such as methyl amyl ketone. Alternately, the acrylic polymer may be prepared by aqueous emulsion or dispersion polymerization techniques.

Besides acrylic polymers, the resinous binder for the coating composition may be an alkyd resin or a polyester. Such polymers may be prepared in a known manner by condensation of polyhydric alcohols and polycarboxylic acids. Suitable polyhydric alcohols include ethylene glycol, propylene glycol, butylene glycol, 1,6-hexylene glycol, neopentyl glycol, diethylene glycol, glycerol, trimethylolpropane and pentaerythritol.

Suitable polycarboxylic acids include succinic acid, adipic acid, azelaic acid, sebacic acid, maleic acid, fumaric acid, phthalic acid, tetrahydrophthalic acid, hexahydrophthalic acid, and trimellitic acid. Besides the polycarboxylic acids mentioned above, functional equivalents of the polycarboxylic acids such as anhydrides where they exist or lower alkyl esters of the polycarboxylic acids such as the methyl esters may be used.

Where it is desired to produce air-drying alkyd resins, suitable drying oil fatty acids may be used and include those derived from linseed oil, soya bean oil, tall oil, dehydrated castor oil or tung oil.

The polyesters and preferably the alkyd resins contain a portion of free hydroxyl and/or carboxyl groups which are available for further crosslinking reaction. Suitable crosslinking agents are the amine or amidealdehyde condensates or the polyisocyanate curing agenst as mentioned above.

Polyurethanes can also be used as the resinous binder of the coating composition. Among the polyurethanes which can be used are polymeric polyols which are prepared by reacting the polyester polyols or acrylic polyols such as those mentioned above with a polyisocyanate.

The organic polyisocyanate which is used to prepare the polyurethane polyol can be an aliphatic or an aromatic polyisocyanate or a mixture of the two. Diisocyanates are preferred, although higher polyisocyanates can be used in place or in combination with diisocyanates.

Examples of suitable aromatic diisocyanates are 4,4'-diphenyl-methane diisocyanate and toluene diisocyanate. Examples of suitable aliphatic diisocyanates are straight chain aliphatic diisocyanates such as 1,6-hexamethylene diisocyanate. Also, cycloaliphatic diisocyanates can be employed Examples include isophorone diisocyanate and 4,4'-methylene-bis-(cyclohexyl isocyanate). Examples of suitable higher polyisocyanates are 1,2,4-benzene triisocyanate and polymethylene polyphenyl isocyanate.

Most of the polymers prepared as described above are organic solvent base polymers, although acrylic polymers can be prepared via aqueous emulsion polymerization techniques. Resinous compositions described in U.S. Pat. No. 4,430,003, and water-based polyurethanes, such as those prepared in accordance with U.S. Pat. No. 4,147,679 may be used as the resinous binder in the coating composition.

Epoxy resins, i.e., polyepoxides, are those materials having a 1,2 epoxide group present in the molecule. Hydroxyl groups may also be present and often are. Polyepoxides contain more than one 1,2-epoxy group per molecule. In general, the epoxide equivalent weight can range from about 280 to about 4,000. These polyepoxides are saturated or unsaturated, cyclic or acyclic, aliphatic, alicyclic, aromatic or heterocyclic. They can contain substituents such as halogen, hydroxyl and ether groups.

One usefully class of polyepoxides comprises the epoxy polyethers obtained by reacting an epihalohydrin (such as epichlorohydrin or epibromohydrin) with a polyphenol in the presence of an alkali. Suitable polyphenols include resorcinol, catechol, hydroquinone, bis(4,hydroxyphenyl)-2,2-propane, i.e., bisphenol A; bis(4-hydroxyphenyl)-1,1-isobutane; 4,4-dihydroxybenzophenone; bis(4-hydroxyphenyl)1,1-ethane; bis(2-hydroxynaphenyl)-methane; and 1,5-hydroxynapthalene. One very common polyepoxide is a polyglycidyl ether of a polyphenol, such as bisphenol A.

Another class of epoxy resins are the polyglycidyl ethers of polyhydric alcohols. These compounds may be derived from such polyhydric alcohols as ethylene glycol, diethylene glycol, triethylene glycol, 1,2-propylene glycol, 1,4-butylene glycol, 1,5-pentanediol, 1,2,6-hexane-triol, glycerol, trimethylolpropane, and bis(4-hydroxycyclohexyl)-2,2-propane.

Another class of epoxide resins are the polyglycidyl esters of polycarboxylic acids. These compounds are produced by the reaction of epichlorohydrin or a similar epoxy compound with an aliphatic or aromatic polycarboxylic acid such as oxalic acid, succinic acid, glutaric acid, terephthalic acid, 2,6-naphthalene dicarboxylic acid and dimerized linoleic acid.

Still another class of polyepoxides are derived from the epoxidation of a olefinically unsaturated alicyclic compound. These polyepoxides are non-phenolic and are obtained by epoxidation of alicyclic olefins, for example, by oxygen and selected metal catalysts, by perbenzoic acid, by acid-aldehyde monoperacetate or by peracetic acid. Among such polyepoxides are the epoxy alicyclic ethers and esters well known in the art.

Useful polyepoxides also include those containing oxyalkylene groups in the epoxy molecule. Another class of polyepoxides consists of the epoxy novolac resins. These resins are obtained by reacting an epihalohydrin with the condensation produce of aldehyde and monohydric or polyhydric phenols. A typical example of the reaction product of epichlorohydrin with a phenolformaldehyde condensate.

Another group of epoxide containing materials includes acrylic copolymers containing copolymerized glycidyl acrylate or methacrylate units. These acrylic copolymers can be prepared by the reaction alkyl esters of alpha, betz unsaturated mono- or di-carboxylic acids with either glycidyl acrylate or methacrylate. Other glycidyl containing copolymerizable monomers such as diglycidyl itaconate and diglycidyl maleate also can be used. These monomers can be optionally copolymerized in the presence of other copolymerizable monomers such as vinyl aromatic compounds, such as stryene or vinyl toluene, and also acrylonitrile or methacrylonitrile.

The phenolic resins commonly referred to as phenoplasts are obtained by the condensation of phenol or alkyl substituted phenols with aldehydes. The monohydric phenols such as phenol, cresol and xylenol are the most typically utilized since they are readily available and relatively inexpensive. Phenol is the typically preferred monohydric phenol. Polyhydric phenols such as resorcinol can also be used herein. Formaldehyde is the preferred aldehyde used in the production of the phenolic resins. Other aldehydes which are also useful include acetaldehyde, butyraldehyde and furfuraldehyde. The preferred phenolic resin is produced by the condensation of phenol and formaldehyde.

Examples of suitable curing agents are cobalt, lead, manganese, driers such as naphthanates, polyamines such as triethylenetetramine, polyamide resins such as those prepared from a fatty dibasic acid and ethylene diamine, aminoplast curing agents, which are based on the addition products of formaldehyde with an amino- or amido-group carrying substance, as described in U.S. Pat. No. 4,680,346, column 9, lines 37–68, isocyanates (free and blocked), phenolic resins, as described earlier, and self condensing polymers.

Depending upon the particular binder used, the coating composition may also contain suitable solvents, curing agents, plasticizers and the like. Solvent levels used depend upon the organic binder and are generally used in amounts sufficient to reduce viscosity for ease of application. Examples of suitable solvents are aromatic petroleum distillates, mineral spirits, cyclohexane, alcohols such as methanol, ethanol, propanol, butanol, and diacetone alcohol, methyl ethyl ketone, ethyl butyl ketone, xylene, toluene, methyl isopropyl ketone, methyl isobutyl ketone, ethylene glycol monobutyl ether, ethylene glycol monoethyl ether, ethylene glycol monoethyl ether acetate, diethylene glycol monobutyl ether, diethylene glycol diethyl ether, ethyl acetate, buty acetate, dimethyl phthalate and the like. Mixtures of these solvents also may be used.

It is to be appreciated, of course, that the specific amounts of the individual components in the coating composition as well as the types used will depend in each instance upon the particular binder as well as upon the ultimate characteristics desired for the particular coating composition end use. In addition, conventional additives for film-forming coating compositions may also be present. These additives include: surfactants, antioxidants, ultraviolet light absorbers, stabilizers, rheology control agents, coalescing agents, plasticizers and the like.

The coating composition may be formulated by admixing the binder, solvent, inhibitive silica, auxiliary filler(s) and other components of the composition, i.e., the volatile and non-volatile components, using conventional mixing equipment that is capable of providing an adequate dispersion of the non-volatile components, i.e., pigments and fillers, in the volatile or liquid components, i.e., the binder and solvent. The coating composition may then be applied to the corrodible metallic surface to be protected using any suitable technique as, for example, by spraying, brushing, immersion, flowing, roll coating, electrodeposition or the like. Generally, the coatings are applied to produce a resultant coating or film having an average thickness of from about 0.1 to about 5 mils, preferably from about 0.2 to about 2 mils. Following application of the coating composition to the metal surface to be protected, drying and/or curing of the coating is effected. The particular type and extent of the drying and/or curing will necessarily vary in each particular instance, depending upon the specific nature of the binder material which is used in the composition. Therefore, in some instances, heating may be utilized to effect drying or curing of the protective coating, while in other instances, air drying or curing may prove sufficient.

The present invention is more particularly described in the following examples, which are intended as illustrative only, since numerous modifications and variations therein will be apparent to those skilled in the art.

EXAMPLE 1

Ninety (90) liters of distilled water was charged to a 150 liter reactor equipped with a high shear agitator near the side of the reactor and a low rpm agitator in the middle of the reactor and the water heated to 90° C. An aqueous reactant solution of sodium silicate was prepared by diluting 11.334 liters of sodium silicate having the approximate molecular formula $Na_2O(Si_2O)_{3.2}$ and a $Na_2O$ concentration of 79.4 grams/liter with distilled water to a total volume of 48 liters. An aqueous reactant solution of calcium chloride and hydrochloric acid was prepared by dissolving 805.5 grams of anhydrous calcium chloride in 6 liters of distilled water, adding thereto 615 milliliters (ml) of concentrated hydrochloric acid, and diluting the mixture to a total volume of 10.8 liters with distilled water. The two reactant solutions were added simultaneously but separately to the heated water in the reactor over 2⅓ hours. The aqueous sodium silicate solution was introduced into the reactor at a location opposite to the location at which the calcium chloride-hydrochloric acid reactant was added and at a rate of 320 ml/minute. The aqueous calcium chloride-hydrochloric acid mixture was introduced into the reactor at a location near the high shear agitator at a rate of 72 ml/minute.

Following addition of all of the reactant solutions stirring of the resulting slurry with both agitators was continued for 1 hour while maintaining the slurry temperature at 90° C. The slurry pH was then adjusted from 9.6 to 7.5 by adding 1000 ml of concentrated hydrochloric acid thereto. The slurry was then filtered and the filter cake washed ten times with 4 liter volumes of distilled water. The filter cake was repulped and stirred for 45 minutes on a (Kotthoff) mixer at high speed. The resulting liquified flowable cake was placed in a tray and dried overnight at 105° C. in a forced air oven.

The dried product was milled in a laboratory hammer mill (Bantam Mikro-Pulverizer). The properties of the milled product were found by appropriate analyses to be: BET surface area—28 m²/g; oil absorption—113 milliliters of oil; conductivity—174 microohms/centimeter; median agglomerate particle size—9.4 micrometers; and calcium content—7.5 weight percent (CaO).

EXAMPLE 2

A series of paints were prepared using the inhibitive silica product of Example 1, strontium chromate, or no inhibitive pigment. The components of the pain formulations are listed in Table I as parts by weight.

TABLE I

| Component | A | B | C |
|---|---|---|---|
| Part 1 | | | |
| Butylated Urea Formaldehyde Resin[1] | 22.5 | 22.5 | 22.5 |
| Bisphenol A Epoxy Resin[2] (EEW = 2250) | 23.4 | 23.4 | 23.4 |
| Diacetone Alcohol | 27.0 | 27.0 | 27.0 |
| Xylene | 23.2 | 23.2 | 23.2 |
| Kaolin[3] | 48.5 | 48.5 | 48.5 |
| Rutile Titanium Dioxide[4] | 33.6 | 33.6 | 33.6 |
| Modified Montmorillonite Clay[5] | 1.7 | 1.7 | 1.7 |
| Inhibitive Pigment Example 1 | — | — | 20.4 |
| Strontium Chromate | 12.5 | — | — |
| Part 2 | | | |
| Butylated Urea Formaldehyde Resin[1] | 42.0 | 28.0 | 42.0 |
| Bisphenol A Epoxy Resin[2] | 116.0 | 88.8 | 116.0 |
| Xylene | 66.4 | 53.4 | 66.4 |
| Diacetone Alcohol | 17.9 | 14.4 | 17.9 |

[1]Available from American Cyanamid as Beetle 1074.
[2]Available from Shell Chemical, USA, as Epon 1007-FMU-40.
[3]Available from Engelhard Corp. as ASP-600 Hydrous Kaolin.
[4]Available from E. I. Dupont de Nemours as R-960.
[5]Available from NL Chemicals as Bentone 38.

The paint compositions were prepared by combining the raw materials from Table I (Part 1) and dispersing same in a laboratory mill using zirconium oxide media to a 7.0 Hegman fineness of grind. The components in Part 2 of Table I were then blended and added to the pigment dispersion and mixed until homogeneous. The coating composition was then filtered to remove the dispersion media.

Coatings were applied to G90 hot dip galvanized steel pretreated with Bonderite ® 1303 (Parker Chemical pretreatment chemical as per the manufacturer's recommended procedures. Coatings were applied with a wire wound towards drawbar and cured in a high velocity gas-fired oven for 50 seconds at 610° F. (321°

C.) to achieve a 564° F. (240.6° C.) peak metal temperature. Dry film thickness was measured at 0.2 mils. Panels were then topcoated with a commercially available polyester coating (POLYCRON ® Super D, PPG Industries, Inc.) and baked for 50 seconds at 570° F. (299° C.) to achieve a 435° F. (224° C.) peak metal temperature. The total film thickness after topcoating was 1.9 mil. The coated panels were subjected to 1,000 hours corrosion testing in accordance with ASTM B117-85 Salt Spray Test and rated for adhesion and corrosion at the scribe. Results are tabulated in Table II.

TABLE II

| Coating Composition | Descriptor | Scribe Corrosion (mm) | Adhesion (% Loss by Taping) |
|---|---|---|---|
| A | SrCrO$_4$ | 8 | 0 |
| B | No Inhibitive Pigment | 12 | 20 |
| C | Example 1 | 2 | 0 |

The data of Table II demonstrates that the calcium-containing amorphous precipitated silica of Example 1 provides maintenance of coating adhesion and a level of corrosion inhibition that is at least equivalent to strontium chromate, the standard in the industry.

EXAMPLE 3

In a manner similar to Example 1, 49 liters of an aqueous sodium silicate solution having an Na$_2$O content of 72.8 grams/liter [Na$_2$O(SiO$_2$)$_{3.2}$] was charged at a rate of 600 ml/min to 90 liters of 90° C. water contained in a 150 liter reactor. An aqueous solution of calcium chloride and hydrochloric acid was charged at a rate of 135 ml/min to the reactor simultaneously with the introduction of the sodium silicate solution. This solution was prepared by dissolving 3222 grams of anhydrous calcium chloride (95% CaCl$_2$) in 6 liters of water and adding 2.46 liters of concentrated hydrochloric acid thereto. The resulting CaCl$_2$—HCl mixture was then diluted to a total volume of 10.8 liters with water. The two reactant solutions were added to the reactor over 80 minutes while stirring the reactor contents with a six inch flat blade high shear agitator at 1500 rpm. Heat was supplied to the reactor by means of a steam coil.

After all of the reactants had been charged to the reactor, the slurry in the reactor was stirred for an additional 3 hours while maintaining the slurry at 90° C. During this 3 hour aging period, the slurry was recycled through a Arde Dicon mixer at a rate of about 2–3 liters/minute. The heat aged slurry was then treated with 7696 milliliters of hydrochloric acid (4 liters of concentrated HCl diluted to 7696 milliliters with water) to adjust the slurry pH from 9.4 to 7.6.

The slurry was filtered and the filter cake washed, first 24 times with 4 liter volumes of water, and then 12 times with 4 liter volumes of distilled water. The washed filter cake was liquified on a Cowles ® mixer at 8000 rpm for 30 minutes and then dried at 105° C. in a forced air oven. The dried product was milled in a laboratory hammer mill using H.B. 0.010 inch screen. The properties of the milled product were found by appropriate analyses to be: BET surface area—36 m$^2$/g; oil absorption—143 milliliters of oil; conductivity—147 micromhos per centimeter; median agglomerate particle size—2.55 micrometers; pH—9.3; and calcium content—6.63 weight percent (as CaO).

While the invention has been described in detail with certain embodiments thereof, it is to be understood that the invention is not intended to be limited by such details, except as and insofar as they appear in the appended claims.

We claim:

1. Amorphous precipitated silica having a surface area of from about 10 to about 50m$^2$/gram, an oil absorption of from about 40 to about 100 ml., a conductivity of less than 300 micromhos per centimeter, a pH of from about 7 to about 10.5, and a median agglomerate particle size of from about 3 to about 8 micrometers, said silica containing between about 6 and about 9 weight percent calcium (as CaO).

2. Amorphous precipitated silica of claim 1 wherein the surface area is from about 15 to about 40 m$^2$/gram, and the oil absorption is from about 60 to about 80 ml.

3. Amorphous precipitated silica of claim 2 wherein the conductivity is less than 180 micromhos per centimeter and the pH is from about 8 to about 9.9.

4. Amorphous precipitated silica of claim 3 wherein the conductivity is from about 75 to about 150 micromhos per centimeter.

5. A method for producing calcium-containing amorphous precipitated silica that inhibits corrosion of a corrodible metal surface when incorporated into a coating applied to said surface, comprising the sequential setps of adding simultaneously to water in a reactor the reactants alkali metal silicate, water-soluble calcium compound and acidifying agent, combining said reactants with agitation at a temperature of between about 20° C. and about 95° C., allowing the combined reactants to reach equilibrium, adjusting the pH of the resulting aqueous silica slurry with additional acidification agent to between about 7 and 8, separating the silica from the aqueous silica slurry, washing separated silica until the conductivity thereof is less than 300 micromhos per centimeter and drying the washed silica, the amount of water-soluble calcium compound added being sufficient to yield about one mole of calcium to about ten moles of silica, and the amount of acidification agent admixed with the alkali metal silicate and water-soluble calcium compound being sufficient to neutralize between about 15 and about 50 percent of the alkali metal oxide content of the alkali metal silicate.

6. The method according to claim 5 wherein the alkali metal silicate is sodium silicate, the water-soluble calcium compound is calcium chloride and the acidification agent is hydrochloric acid.

7. The method according to claim 6 wherein the sodium silicate may be expressed by the molecular formula Na$_2$O(SiO$_2$)$_x$, wherein x is a number between 3.0 and 3.4.

8. The method according to claim 6 wherein the reactants are combined at temperatures between 80° C. and 95° C.

9. The method according to claim 8 wherein the amount of acidification agent admixed with the sodium silicate and calcium chloride is sufficient to neutralize about 25 percent of the alkali metal oxide content of the sodium silicate reactant.

10. The method according to claim 6 wherein the calcium chloride and hydrochloric acid are premixed and then added to the reactor.

11. The method according to claim 5 wherein the acidification agent and water-soluble calcium compound are added to the reactor at a location of high shear agitation and the alkali metal silicate reactant is added to the reactor at a location displaced from the area of high shear agitation.

12. The method according to claim 5 wherein the separated silica is washed until the conductivity thereof is less than 180 micromhos per centimeter.

13. The method according to claim 5 wherein the dried silica is milled to a median agglomerate particle size of from about 3 to about 8 micrometers.

14. The method according to claim 5 wherein the equilibrating aqueous silica slurry is circulated through a wet mill.

15. The method according to claim 5 wherein the washed silica is spray dried.

16. The method according to claim 7 wherein the reactants are combined at temperature between 80° C. and 95° C., the calcium chloride and hydrochloric acid are premixed and added to the reactor at a location of high shear agitation, the sodium silicate is added to the reactor at a location displaced from the area of high shear agitation, and the separated silica is washed until the conductivity thereof is less than 180 micromhos per centimeter.

17. The method according to claim 16 wherein the washed silica is spray dried.

18. The method according to claim 16 wherein the equilibrating aqueous silica slurry is circulated through a wet mill.

19. The method according to claim 17 wherein the dried silica is milled to a median agglormerate particle size of between about 3 and about 8 micrometers.

20. In a film-forming coating composition for a corrodible metal surface, which composition contains a volatile component including a resinous organic binder, a non-volatile component and a corrosion inhibiting amount of a corrosion inhibiting pigment, the improvement wherein the corrosion inhibiting pigment is calcium-containing amorphous precipitated silica, said silica having a surface area of from about 10 to about 50 $m^2$/gram, an oil absorption of from about 40 to about 100 ml, a conductivity of less than 300 microhmos per centimeter, a pH of from about 7 to about 10.5, and a median agglomerate particle size of from about 3 to about 8 micrometers, said silica containing between about 6 and about 9 weight percent calcium (as CaO).

21. The coating composition of claim 20 wherein the amount of corrosion inhibiting silica is between about 2 and about 15 weight percent.

22. The coating composition of claim 21 wherein the organic resinous binder is selected from the group consisting of epoxy resins, polyesters, acrylic polymers and polyurethanes.

23. The coating composition of claim 21 wherein the amorphous precipitated silica has a surface area of from about 15 to about 40$m^2$/gram, an oil absorption of from about 60 to about 80 ml, a conductivity of less than 180 micromhos and a pH of from about 8 to about 9.9.

24. The coating composition of claim 23 wherein the volatile components of the coating composition represent between 34 and 60 weight percent, and the non-volatile component represents from about 25 to about 65 weight percent.

* * * * *

UNITED STATES PATENT AND TRADEMARK OFFICE
CERTIFICATE OF CORRECTION

PATENT NO. : 4,837,253

DATED : June 6, 1989

INVENTOR(S) : J. Douglas Mansell et al

It is certified that error appears in the above-identified patent and that said Letters Patent is hereby corrected as shown below:

Claim 5, Column 12, line 26, "setps" should be --steps--;

Column 12, line 38, after "calcium" add --(as CaO)--

Signed and Sealed this

Twenty-fifth Day of September, 1990

Attest:

HARRY F. MANBECK, JR.

Attesting Officer      Commissioner of Patents and Trademarks